US010747924B2

(12) United States Patent
Pittu et al.

(10) Patent No.: US 10,747,924 B2
(45) Date of Patent: Aug. 18, 2020

(54) METHOD FOR MANUFACTURING INTEGRATED CIRCUIT WITH AID OF PATTERN BASED TIMING DATABASE INDICATING AGING EFFECT

(71) Applicant: TAIWAN SEMICONDUCTOR MANUFACTURING COMPANY LTD., Hsinchu (TW)

(72) Inventors: Ravi Babu Pittu, Andhra Pradesh (IN); Li Chung Hsu, Hsinchu (TW); Sung-Yen Yeh, Pingtung County (TW); Chung-Hsing Wang, Hsinchu County (TW)

(73) Assignee: TAIWAN SEMICONDUCTOR MANUFACTURING COMPANY LTD., Hsinchu (TW)

( * ) Notice: Subject to any disclaimer, the term of this patent is extended or adjusted under 35 U.S.C. 154(b) by 3 days.

(21) Appl. No.: 16/191,172

(22) Filed: Nov. 14, 2018

(65) Prior Publication Data

US 2020/0019663 A1    Jan. 16, 2020

Related U.S. Application Data

(60) Provisional application No. 62/698,556, filed on Jul. 16, 2018.

(51) Int. Cl.
*G06F 30/3312* (2020.01)
*H03K 19/20* (2006.01)
*H01L 21/82* (2006.01)

(52) U.S. Cl.
CPC .......... *G06F 30/3312* (2020.01); *H01L 21/82* (2013.01); *H03K 19/20* (2013.01)

(58) Field of Classification Search
USPC ........................................ 716/113
See application file for complete search history.

(56) References Cited

U.S. PATENT DOCUMENTS

| | | | | |
|---|---|---|---|---|
| 2007/0143722 A1* | 6/2007 | Venkateswaran | ... | G06F 17/5031 716/108 |
| 2007/0288822 A1* | 12/2007 | Lin | ................ | G01R 31/318357 714/741 |
| 2009/0070714 A1* | 3/2009 | Shenoy | ............... | G06F 17/5031 716/132 |
| 2009/0119629 A1* | 5/2009 | Grise | ............... | G01R 31/31835 716/113 |
| 2010/0017774 A1* | 1/2010 | Bachina | .............. | G06F 17/5054 716/128 |
| 2015/0254392 A1* | 9/2015 | Onodera | ............. | G06F 17/5081 716/114 |

* cited by examiner

*Primary Examiner* — Mohammed Alam
(74) *Attorney, Agent, or Firm* — WPAT, P.C., Intellectual Property Attorneys; Anthony King

(57) ABSTRACT

A method for manufacturing an integrated circuit includes determining a static probability pattern of a circuit cell in a timing path of the integrated circuit; determining a timing delay of the circuit cell along the timing path according to the static probability pattern and a pattern based timing database, wherein the pattern based timing database indicates a plurality of reference delays of each timing arc of the circuit cell characterized in response to a plurality of input stress patterns respectively; and manufacturing the integrated circuit according to the timing delay of the circuit cell along the timing path.

20 Claims, 11 Drawing Sheets

```
pin (ZN)
...
timing () {
   pattern: "!A1 !A2"
   pattern_base_derate (delay_template_3x3) {
      type: late;
      index_1 ("0.1, 0.2, 0.3");
      index_2 ("0.01, 0.02, 0.03");
      values ( \
         "1.1, 1.05, 1.01", \
         "1.15, 1.1, 1.01", \
         "1.3, 1.2, 1.1"\
      );
      ...
   }
   pattern: "!A1 A2"
   ...
   pattern: "A1 !A2"
   ...
   pattern: "A1 A2"
   ...
}
```

FIG. 3

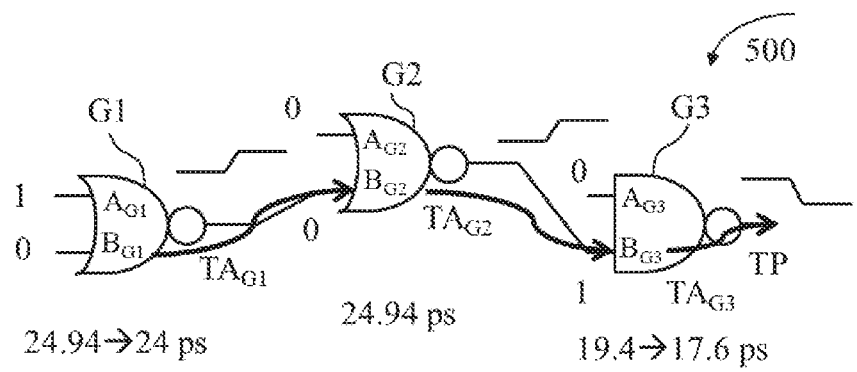
FIG. 8B
| | $B_{NR}A_{NR}$ | Timing arc | Delay (ps) |
|---|---|---|---|
| NOR | 01 | $A_{NR} \rightarrow Z_{NR}$ (R) | 22.5 |
| | 10 | $A_{NR} \rightarrow Z_{NR}$ (R) | 21.93 |
| | 01 | $B_{NR} \rightarrow Z_{NR}$ (R) | 24 |
| | 10 | $B_{NR} \rightarrow Z_{NR}$ (R) | 22.1 |
| | $B_{NA}A_{NA}$ | Timing arc | Delay(ps) |
|---|---|---|---|
| NAND | 01 | $A_{NA} \rightarrow Z_{NA}$ (F) | 16.94 |
| | 10 | $A_{NA} \rightarrow Z_{NA}$ (F) | 18.7 |
| | 01 | $B_{NA} \rightarrow Z_{NA}$ (F) | 19.4 |
| | 10 | $B_{NA} \rightarrow Z_{NA}$ (F) | 17.6 |
TDB
FIG. 9A
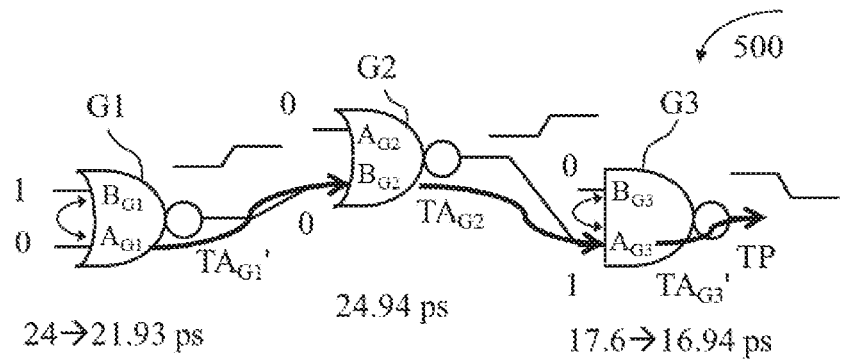
FIG. 9B TDB {
| | $B_{NR}A_{NR}$ | Timing arc | Delay (ps) |
|---|---|---|---|
| NOR (D1) | 00 | $B_{NR} \rightarrow Z_{NR}(R)$ | 24.94 |
| | 11 | $B_{NR} \rightarrow Z_{NR}(R)$ | 22.1 |
| NOR (D2) | 00 | $B_{NR} \rightarrow Z_{NR}(R)$ | 23.75 |
| | 11 | $B_{NR} \rightarrow Z_{NR}(R)$ | 21.05 |

21.93 ps      23.75 ps      16.94 ps

METHOD FOR MANUFACTURING INTEGRATED CIRCUIT WITH AID OF PATTERN BASED TIMING DATABASE INDICATING AGING EFFECT

PRIORITY CLAIM AND CROSS-REFERENCE

The present application claims priority to U.S. Provisional Patent Application No. 62/698,556, filed on Jul. 16, 2018, which is incorporated by reference herein in its entirety.

BACKGROUND

The present disclosure relates to circuit design and, more particularly, to a method for manufacturing an integrated circuit with the aid of a pattern based timing database indicating aging effects.

Device aging refers to device performance degradation over time. For example, when a constant electric field is applied to a gate of a transistor, a phenomenon called negative bias temperature instability (NBTI) can cause a buildup of charge in a gate dielectric, which in turn degrades a threshold voltage of the transistor. As a result, transistor aging caused by NBTI can lead to low switching speeds and cell delay degradation over time. Other degenerative mechanisms, such as hot carrier injection (HCI) and time-dependent dioxide breakdown (TDDB), can also cause transistor aging.

As an operating voltage is not scaled at the same rate as the scaling down of a device size, an electric filed applied to a device will increase, resulting in worse aging behavior. Integrated circuit performance degradation due to aging effects is therefore eating up scaling benefits in fin field-effect transistor (FinFET) technology.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 3 illustrates an exemplary timing library format of the pattern based timing database shown in FIG. 1 in accordance with some embodiments of the present disclosure.

FIG. 8A and FIG. 8B illustrate an exemplary operation involved in determining timing constraints of the integrated circuit shown in FIG. 5 in accordance with some embodiments of the present disclosure.

FIG. 9A and FIG. 9B illustrate an exemplary operation involved in determining timing constraints of the integrated circuit shown in FIG. 5 in accordance with some embodiments of the present disclosure.

DETAILED DESCRIPTION

Figure 1:
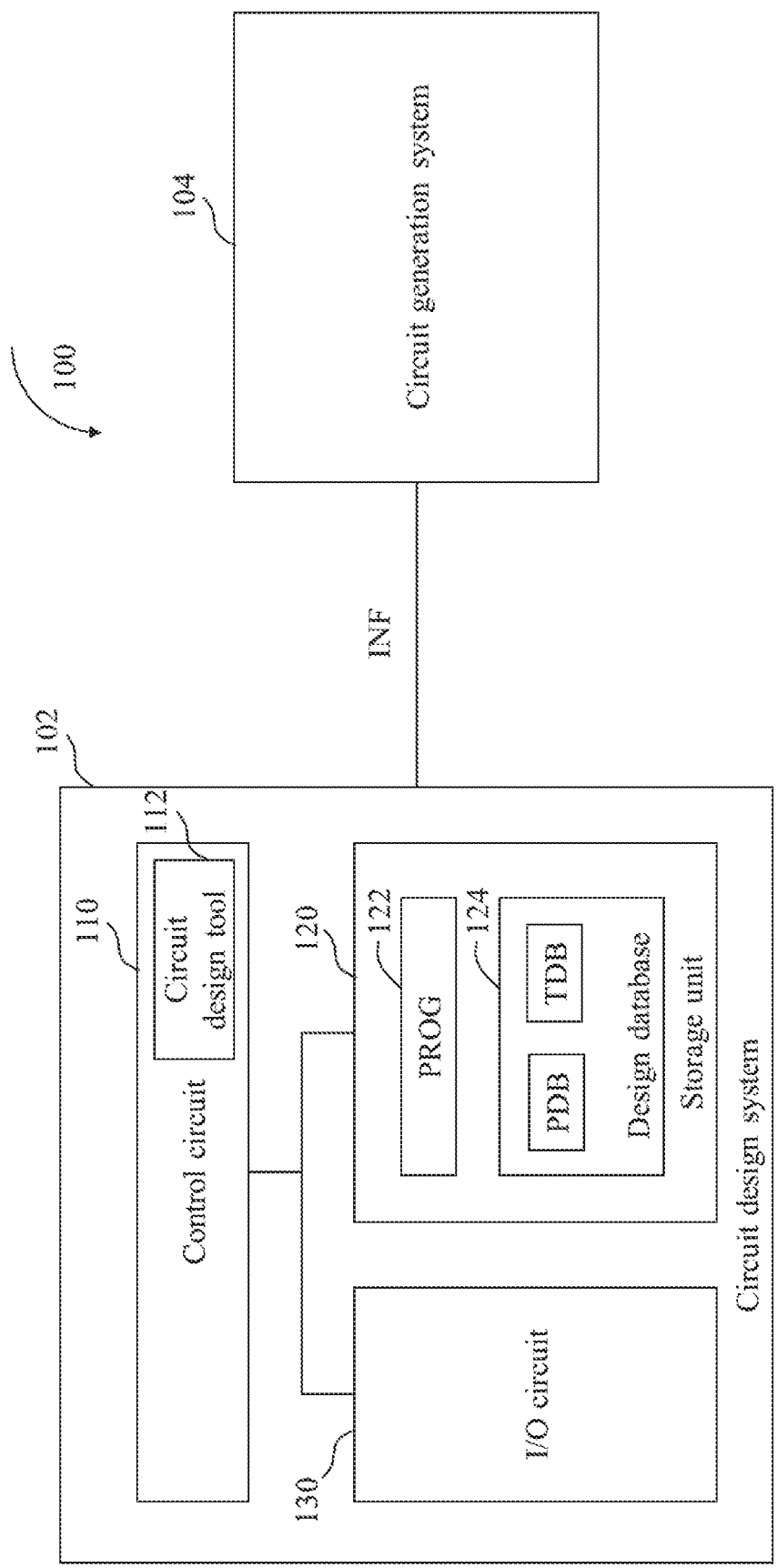
FIG. 1 illustrates an exemplary system for manufacturing an integrated circuit in accordance with some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, it will be understood that when an element is referred to as being "connected to" or "coupled to" another element, it may be directly connected to or coupled to the other element, or intervening elements may be present.

In the below description, a signal is asserted with a logical high value to activate a corresponding device when the device is active high. In contrast, the signal is deasserted with a low logical value to deactivate the corresponding device. When the device is active low, however, the signal is asserted with a low logical value to activate the device, and is deasserted with a high logical value to deactivate the device.

To ensure functional correctness over a product's lifetime, extra timing margins can be added in the circuit design. For example, the added timing margin is derived based on an end-of-life (EOL) approach, which assumes each device element, such as a transistor, suffers identical degradation. Device degradation can be estimated according to at least one of voltage, temperature, life cycle and percentile analyses. However, implementing an integrated circuit with the EOL approach may produce an over-constrained design because of ignorance of the real circuit usage profile and aging sensitivity difference in standard cell pins. The over-constrained design uses pessimistic and excessive aging margins for guard-banding potential timing violations due to aging. For example, respective delay times of different device elements in the over-constrained design are characterized by a timing library or flat guard-banding formats, wherein the timing library is constructed with high percentile device degradation and worst-case stress. As a result, the excessive aging margins often penalize a circuit design having low performance, high power and big area, and also becomes a burden to advanced technology nodes.

The present disclosure describes exemplary methods for manufacturing integrated circuits with the aid of a pattern based timing database, also referred to as an input stress based aging timing database. The pattern based timing database can be created by taking into account circuit usage profiles and circuit topologies of the integrated circuits. As a result, a timing margin of an integrated circuit manufactured using the exemplary methods would be more realistic, which improves circuit performance.

In some embodiments, the exemplary methods may derive the pattern based timing database as a function of static probability (SP) information. Since a static probability of a circuit pin can indicate a probability that a signal at the circuit pin is at a predetermined logic state, the static probability of the circuit pin can reflect input stress imposed thereon in a circuit usage profile. It is worth noting that aging effects on a circuit cell, such as a standard cell or a logic gate, in an integrated circuit will vary in response to input stress imposed thereon. Hence, when a delay of a timing arc of a circuit cell, such as a standard cell or a logic gate, in an integrated circuit is determined according to a static probability of the circuit cell, the integrated circuit can have an optimized or more realistic timing margin.

In some embodiments, the exemplary methods may use pin sensitivity information as well as static probability information of incoming nets to decide connectivity, with an objective to mitigate aging effects on logic circuit performance with low area overhead. For example, the pattern based timing database may indicate respective timing arc delays of different circuit pins of a circuit cell. A circuit designer or a design tool utilizing the exemplary methods can connect a highly sensitive pin to a low stress probability signal, and connect a less sensitive pin to a high stress probability signal to mitigate performance impact due to aging.

By considering at least one of static probability information and pin sensitivity information of circuit cells in an integrated circuit, a timing margin of the integrated circuit can be more realistic and hence reduce pessimistic assumption in existing methodology. Further description is provided below.

FIG. 1 illustrates an exemplary system for manufacturing an integrated circuit in accordance with some embodiments of the present disclosure. The system 100 can utilize a circuit usage profile and a circuit topology of the integrated circuit (not shown in FIG. 1) to determine a more realistic or optimized timing margin thereof, thereby mitigating aging impacts on circuit performance. The system 100 includes, but is not limited, a circuit design system 102 and a circuit generation system 104. The circuit design system 102 is configured to provide design information INF of the integrated circuit for the circuit generation system 104. The circuit generation system 104 is configured to implement the integrated circuit according to the design information INF. By way of example but not limitation, the circuit generation system 104 is configured to form a circuit on a substrate using a plurality of photomasks in a multi-patterning deposition process and/or other suitable circuit manufacturing process.

In the present embodiment, the circuit design system 102 includes, but is not limited to, a control circuit 110, a storage unit 120 and an input/output (I/O) module 130. The control circuit 110, including at least one processor or at least one controller, is operative to control operations of the circuit design system 102. For example, the control circuit 110 may include central processing unit(s), graphic processing unit (s), general purpose processor(s), digital signal processor(s), microprocessor(s) or other types of processors. As another example, the control circuit 110 may include microcontroller (s), application specific integrated circuit(s), field programmable gate array(s), programmable logic device(s) or other types of controllers.

The storage unit 120 may include any computer-readable media capable of storing data, instructions, software programs, or combinations thereof. For example, the storage unit 120 may be implemented by a memory device including a read-only memory (ROM), a random access memory (RAM), a flash memory, a content addressable memory (CAM), a disk memory, a memory card or any other types of memory devices suitable for storing information. In the present embodiment, the storage unit 120 may store computer program code PROG, i.e. a set of execution instructions, that causes the control circuit 110 to execute operation of a circuit design tool 112 such as computer aided design (CAD) tool or an electronic design automation (EDA) tool. The storage unit 120 may also store a design database 124 for operation of the circuit design tool 112.

The I/O module 130 can be configured to receive input signals for designing the integrated circuit, and output associated information during a design process. By way of example but not limitation, the I/O module 130 may include a keyboard, a mouse, a display, a touch screen, other types of I/O devices, or combinations thereof. When the computer program code PROG is executed, the control circuit 110 may control the I/O module 130 to display a graphic user interface associated with the circuit design tool 112 launching in the circuit design system 102.

In some embodiments, the design database 122 may include a physical design database PDB and a pattern based timing database TDB. The physical design database PDB may include information associated with placement of circuit cells, timing constraints, area constraints, power constraints and floorplan information. The pattern based timing database TDB may indicate timing arc delays of circuit cells under different input stress conditions. The circuit design system 102, or the circuit design tool 112 launching in the circuit design system 102, may update timing constraint information stored in the physical design database PDB according to the pattern based timing database TDB.

For example, the pattern based timing database TDB may indicate respective reference delays of timing arcs of a circuit cell characterized in response to different input stress patterns. It is worth noting that as input stress imposed on the circuit cell may differ in different circuit usage profiles, the reference delays of the timing arcs can serve as timing arc delays of the circuit cell in different circuit usage profiles. With the use of the pattern based timing database TDB, the circuit design system 102 can determine a suitable timing arc delay for each circuit cell in the integrated circuit. The circuit design system 102 may update the timing constraints of the integrated circuit according to the determined timing arc delay. As a result, the design information INF provided for the circuit generation system 104 can indicate a suitable timing margin for the integrated circuit.

Figure 2A:
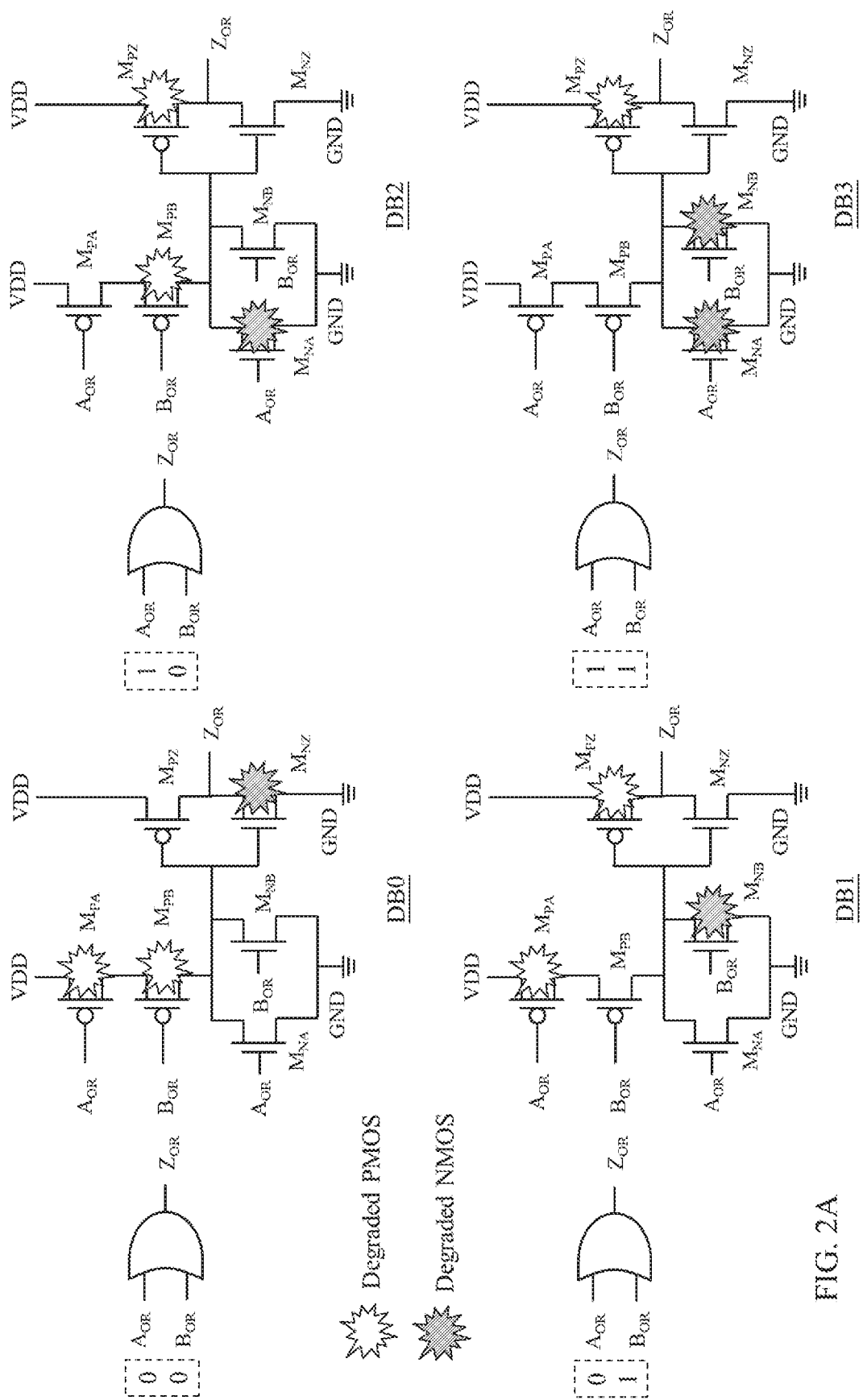
FIG. 2A and FIG. 2B illustrate an exemplary characterization of the pattern based timing database shown in FIG. 1 in accordance with some embodiments of the present disclosure.
Figure 2B:
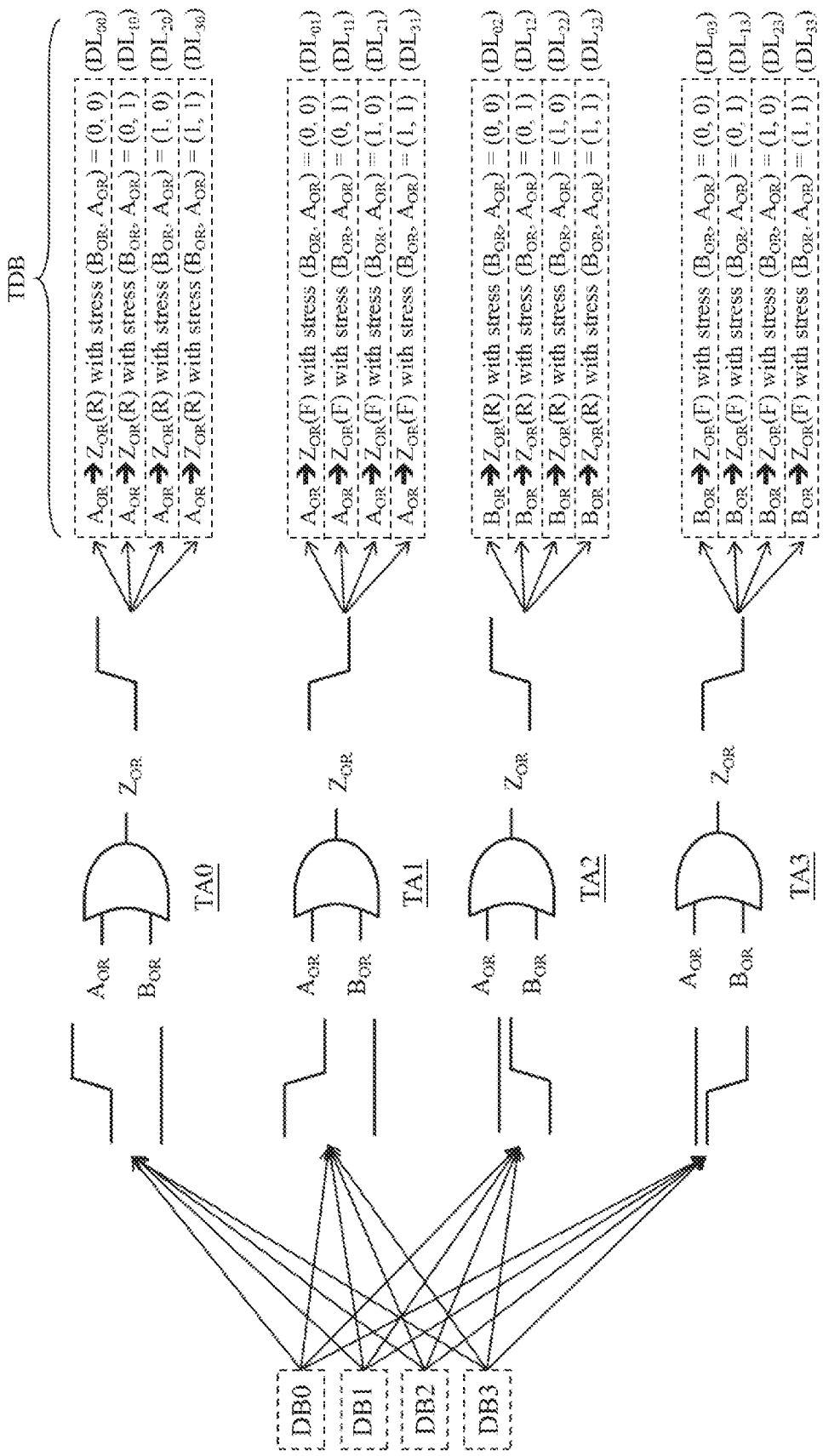

FIG. 2A and FIG. 2B illustrate an exemplary characterization of the pattern based timing database TDB shown in FIG. 1 in accordance with some embodiments of the present disclosure. For illustrative purposes, the characterization shown in FIG. 2A and FIG. 2B is described with reference to an OR gate including p-channel metal-oxide-semiconductor (PMOS) transistors $M_{PA}$, $M_{PB}$ and $M_{PZ}$, and n-channel metal-oxide-semiconductor (NMOS) transistors $M_{NA}$, $M_{NB}$ and $M_{NZ}$. However, those skilled in the art will recognize that the database characterization scheme shown in FIG. 2A and FIG. 2B can be applied to other types of circuit cells, such as standard cells including an AND gate, a NAND gate, a NOR gate, an XOR gate, an XNOR gate, an inverter, a flip-flop and a latch. Also, the pattern based timing database TDB shown in FIG. 1 can include other timing libraries or sub-databases associated with various types of circuit cells. Furthermore, the number of sub-databases in the pattern based timing database TDB may vary in response to the number of input stress patterns. For example, the pattern based timing database TDB may include N sub-databases characterized by N input stress patterns respectively, where N is a positive integer greater than one. Each of the N sub-databases indicates respective reference delays of timing arcs of the circuit cell characterized in response to a corresponding input stress pattern.

Referring to FIG. 2A, different input stress patterns are applied to input pins $A_{OR}$ and $B_{OR}$ of the OR gate to determine sub-databases DB0-DB3 in the pattern based timing database TDB shown in FIG. 1. The different input stress patterns can represent different use scenarios of the OR gate. In the top left portion of FIG. 2A, the input pins $A_{OR}$ and $B_{OR}$ are applied by an input stress pattern "00" to determine the sub-database DB0. The input stress pattern "00" represents that each of the input pins $A_{OR}$ and $B_{OR}$ is coupled to a low voltage such as a ground voltage GND. Since a high electric field is imposed between a gate and a source/drain of the PMOS transistor $M_{PA}$, the PMOS transistor $M_{PA}$ can be labeled a degraded PMOS. Also, the PMOS transistor $M_{PB}$ and the NMOS transistor $M_{NZ}$ can be labeled a degraded PMOS and a degraded NMOS, respectively, under an input stress condition where the input stress pattern "00" is applied to the OR gate.

In the bottom left portion of FIG. 2A, the input pins $A_{OR}$ and $B_{OR}$ are applied by an input stress pattern "01" to determine the sub-database DB1. The input stress pattern "01" represents that the input pins $A_{OR}$ and $B_{OR}$ are respectively coupled to a low voltage and a high voltage such as a supply voltage VDD. As a result, each of the PMOS transistors $M_{PA}$ and $M_{PZ}$ can be labeled a degraded PMOS, and the NMOS transistor $M_{NB}$ can be labeled a degraded NMOS.

Similarly, in the top right portion of FIG. 2A, when the input pins A and B are applied by an input stress pattern "10" to determine the sub-database DB2, each of the PMOS transistors $M_{PB}$ and $M_{PZ}$ can be labeled a degraded PMOS, and the NMOS transistor $M_{NA}$ can be labeled a degraded NMOS. In the bottom right portion of FIG. 2A, when the input pins A and B are applied by an input stress pattern "11" to determine the sub-database DB3, the PMOS transistor $M_{PZ}$ can be labeled a degraded PMOS, and each of the NMOS transistors $M_{NA}$ and $M_{NB}$ can be labeled a degraded NMOS.

Referring to FIG. 2B, delays of timing arcs TA0-TA3 of te OR gate are measured under input stress conditions shown in FIG. 2A. Each of the timing arcs TA0-TA3 defines signal propagation through the OR gate and a timing relationship between two related pins. For example, the timing arc TA0 defines a timing relationship between the output pin $Z_{OR}$ and the input pin $A_{OR}$ where a low-to-high transition occurs. The low-to-high transition occurring at the input pin $A_{OR}$ causes a low-to-high transition occurring at the output pin $Z_{OR}$. As a result, the timing arc TA0 can be represented as "$A_{OR} \rightarrow Z_{OR}(R)$". Similarly, the timing arc TA1, represented as "$A_{OR} \rightarrow Z_{OR}(F)$", defines a timing relationship between the output pin $Z_{OR}$ and the input pin $A_{OR}$ where a high-to-low transition occurs. The timing arc TA2, represented as "$B_{OR} \rightarrow Z_{OR}(R)$", defines a timing relationship between the output pin $Z_{OR}$ and the input pin $B_{OR}$ where a low-to-high transition occurs; the timing arc TA3, represented as "$B_{OR} \rightarrow Z_{OR}(F)$", defines a timing relationship between the output pin Z and the input pin B where a high-to-low transition occurs.

In the present embodiment, the sub-database DB0 indicates four reference delays $DL_{00}$, $DL_{01}$, $DL_{02}$ and $DL_{03}$, which are delay times of the timing arcs TA0-TA3 measured under an input stress condition where the OR gate is applied by the input stress pattern "00". The sub-database DB1 indicates four reference delays $DL_{10}$, $DL_{11}$, $DL_{12}$ and $DL_{13}$, which are delay times of the timing arcs TA0-TA3 measured under an input stress condition where the OR gate is applied by the input stress pattern "01". The sub-database DB2 indicates reference aging delays $DL_{20}$, $DL_{21}$, $DL_{22}$ and $DL_{23}$, which are delay times of the timing arcs TA0-TA3 measured under an input stress condition where the OR gate is applied by the input stress pattern "10". The sub-database DB3 indicates four reference delays $DL_{30}$, $DL_{31}$, $DL_{32}$ and $DL_{33}$, which are delay times of the timing arcs TA0-TA3 measured under an input stress condition where the OR gate is applied by the input stress pattern "11".

As each sub-database can indicate respective reference delays of the timing arc TA0-TA3 under a corresponding input stress condition, the sub-databases DB0-DB3 can indicate reference delays of each timing arc under different input stress conditions. For example, the reference delays $DL_{00}$, $DL_{10}$, $DL_{20}$ and $DL_{30}$ of the timing arc TA0, respectively corresponding to the input stress patterns "00", "01", "10" and "11", can be provided by the sub-databases DB0-DB3. It is worth noting that as different input stress patterns can reflect different use scenarios of the OR gate, the reference delays $DL_{00}$, $DL_{10}$, $DL_{20}$ and $DL_{30}$ of the timing arc TA0 can reflect different aging effects on the OR gate in different circuit usage profiles.

In some embodiments, reference delays of timing arcs can be stored in a timing library format expression or in any other suitable format. FIG. 3 illustrates an exemplary timing library format of the pattern based timing database TDB shown in FIG. 1 in accordance with some embodiments of the present disclosure. The timing library format shown in FIG. 3 can represent an embodiment of a timing library format for reference delays of each timing arc shown in FIG. 2A and FIG. 2B. In the present embodiment, "pattern" syntax represents an input stress pattern used to characterize reference delays. By way of example but not limitation, "!A1 !A2", "!A1 A2", "A1 !A2" and "A1 A2" can represent the input stress patterns "00", "01", "10" and "11", respectively. For the sake of brevity, reference delays characterized in response to the input stress patterns "01", "10" and "11", represented by "!A1 A2", "A1 !A2" and "A1 A2" respectively, are not shown in FIG. 3.

As shown in FIG. 3, a reference delay characterized in response to the input stress patterns "00", represented by "!A1 !A2", is expressed in a derate format with device characteristics including input slew rates and output loads. By way of example but not limitation, "index_1" represents an input slew index at a slow corner ("late"), "index_2" represents an output load index, and "values" represents candidate derating factors of the reference delay. As each of "index_1" and "index_2" may have three possible values, the reference delay may correspond to nine candidate derating factors. Other reference delays, characterized in response to the input stress patterns "01", "10" and "11" respectively, can be expressed in a similar/identical derate format.

When a reference delay of a timing arc is used to set a timing delay of a circuit cell, the timing delay, or the reference delay, is equal to a corresponding derating factor multiplied by a base delay of the timing arc. The base delay is characterized without applying the input stress patterns "00", "01", "10" and "11" to the circuit cell.

Since the sub-databases DB0-DB3 shown in FIG. 2B can indicate reference delays of each timing arc of the OR gate in different circuit usage profiles, a timing margin of an integrated circuit including an OR gate would be more realistic when a circuit usage profile of the integrated circuit can be known. In some embodiments, static probability information of an integrated circuit can be used to reflect a circuit usage file of the integrated circuit. A static probability at a circuit pin can indicate a probability that a signal received at the circuit pin is at a predetermined logic state. For example, a static probability indicating that a signal is at a logic high state (logic "1" state) can be referred to as SP1, and a static probability indicating that a signal is at a logic low state (logic "0" state) can be referred to as SP0. As a result, the static probability information, e.g. respective static probabilities of circuit pins in the integrated circuit, can serve as information regarding the circuit usage file of the integrated circuit. By taking into account the static probability information, a timing margin of the integrated circuit would be more realistic.

Figure 4:
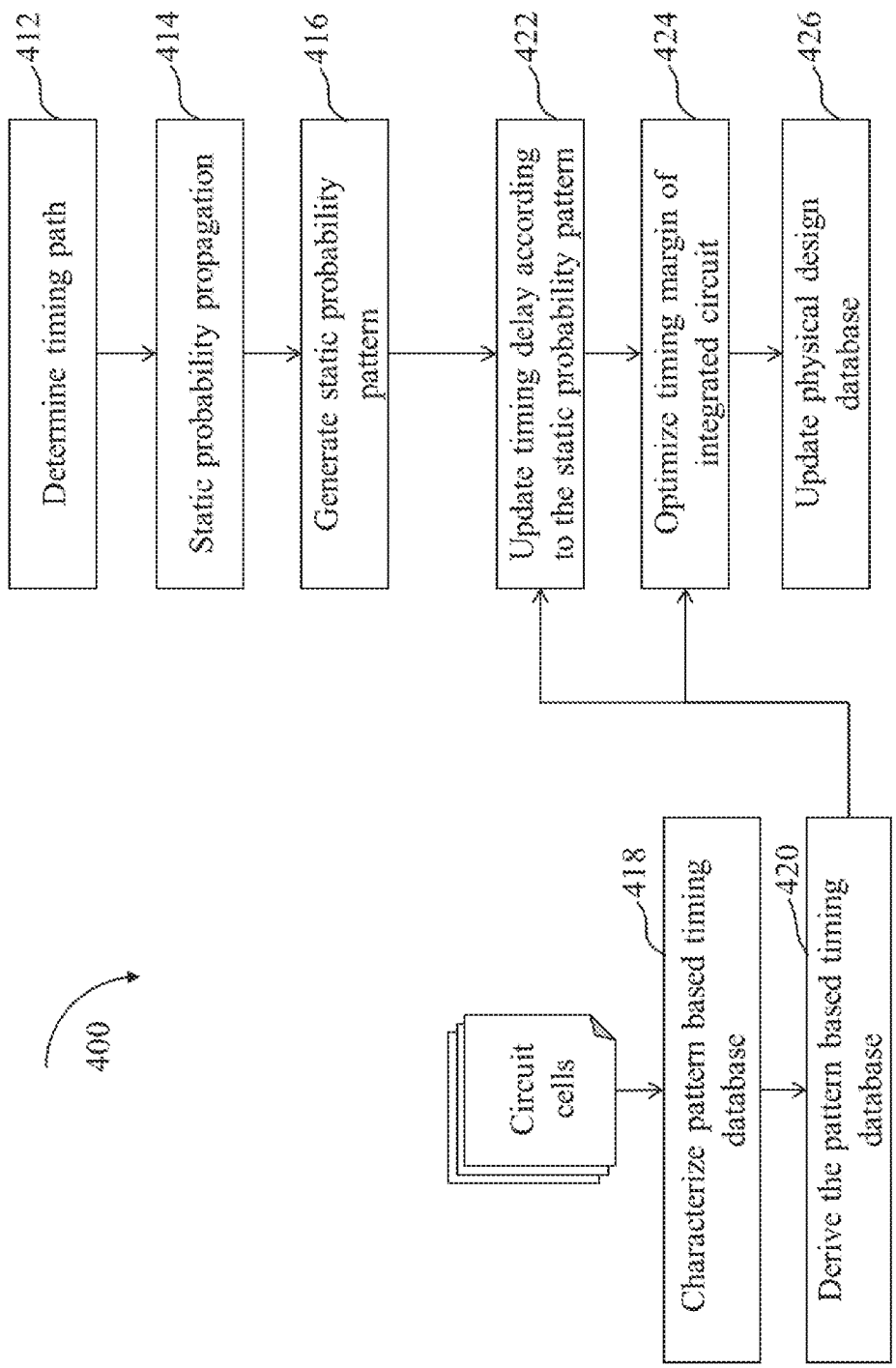
FIG. 4 illustrates a flow chart of an exemplary method for determining timing constraints of an integrated circuit in accordance with some embodiments of the present disclosure.

FIG. 4 illustrates a flow chart of an exemplary method for determining timing constraints of an integrated circuit in accordance with some embodiments of the present disclosure. The method 400 can be employed in the circuit design system 102 shown in FIG. 1 to determine a more realistic timing margin, or aging timing margin, of the integrated circuit. However, this is not intended to limit the scope of the present disclosure. The method 400 can be employed in other systems for manufacturing an integrated circuit to determine more realistic timing margins.

Figure 5:
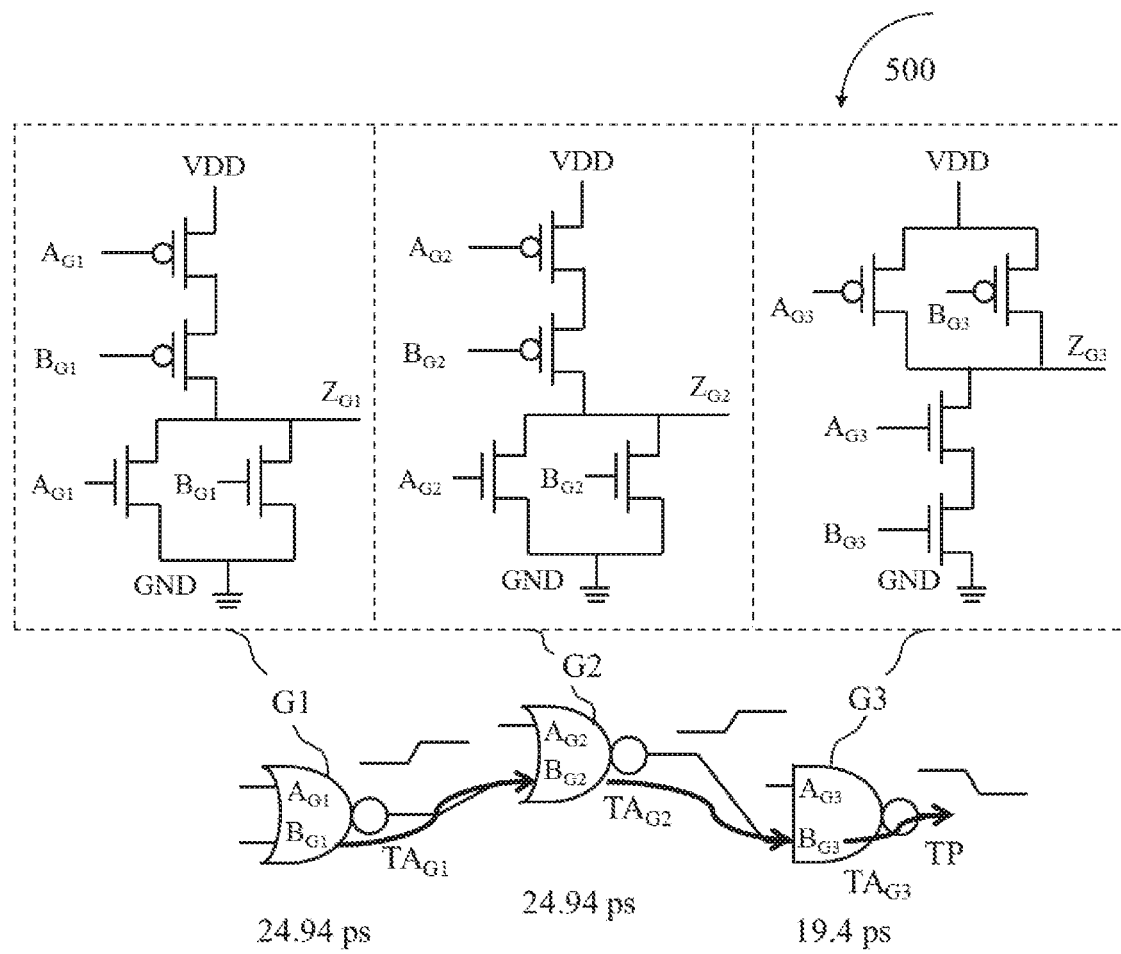
FIG. 5 illustrates at least a portion of an exemplary integrated circuit designed using the method shown in FIG. 4 in accordance with some embodiments of the present disclosure.
Figure 6:
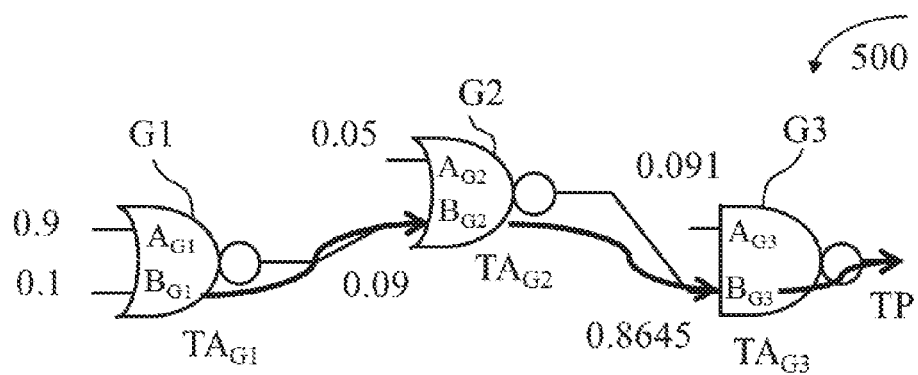
FIG. 6 illustrates an exemplary operation involved in determining timing constraints of the integrated circuit shown in FIG. 5 in accordance with some embodiments of the present disclosure.

To facilitate understanding of the present disclosure, the method 400 is described below with reference to the system 100 shown in FIG. 1 together with circuit topologies shown in FIG. 5 to FIG. 10B. FIG. 5 illustrates at least a portion of an exemplary integrated circuit designed using the method 400 shown in FIG. 4, in accordance with some embodiments of the present disclosure. FIG. 6 to FIG. 10B illustrate operations involved in determining timing constraints of the integrated circuit shown in FIG. 5 in accordance with some embodiments of the present disclosure. However, those skilled in the art will recognize that the method 400 can be used to design other circuit topologies without departing from the scope of the present disclosure. Additionally, in some embodiments, other operations in the method 400 can be performed. In some embodiments, operations of the method 400 can be performed in a different order and/or vary.

At operation 412, a timing path of the integrated circuit is determined. The timing path passes through a set of circuit cells of the integrated circuit. For example, with reference to FIG. 1 and FIG. 5, the circuit design tool 112 may place and route circuit cells of the integrated circuit 500, which includes a NOR gate G1, a NOR gate G2 and a NAND gate G3. The NOR gate G1 has an input pin $A_{G1}$, an input pin $B_{G1}$ and an output pin $Z_{G1}$. The NOR gate G2 has an input pin $A_{G2}$, an input pin $B_{G2}$ and an output pin $Z_{G2}$. The NAND gate G3 has an input pin $A_{G3}$, an input pin $B_{G3}$ and an output pin $Z_{G3}$. In addition, the circuit design tool 112 may determine a timing path TP according to the physical design database PDB. The timing path TP may be, but is not limited to, a critical path which is a path between an input and an output of the integrated circuit 500 with the maximum delay.

In the present embodiment, the timing path TP includes a plurality of timing arcs $TA_{G1}$-$TA_{G3}$. Based on the physical design database PDB, the timing arc $TA_{G1}$ models a timing delay of 24.94 picoseconds (ps) that a signal takes to propagate from the input pin $B_{G1}$ to the output pin $Z_{G1}$ where a low-to-high transition occurs. The timing arc $TA_{G2}$ models a delay of 24.94 ps that a signal takes to propagate from the input pin $B_{G2}$ to the output pin $Z_{G2}$ where a low-to-high transition occurs. The timing arc $TA_{G3}$ models a delay of 19.4 ps that a signal takes to propagate from the input pin $B_{G3}$ to the output pin $Z_{G3}$ where a high-to-low transition occurs. As a result, the physical design database PDB indicates that the timing path TP has a path delay of 69.28 ps. In some embodiments, these predetermined delays indicated by the physical design database PDB, i.e. 24.94 ps and 19.4 ps, may be worst-case delays.

At operation 414, static probability propagation is performed along the timing path to determine a first static probability at each input pin of each circuit cell. The first static probability indicates a probability that a signal received at the input pin in the timing path is at a predetermined logic state. For example, with reference to FIG. 1 and FIG. 6, the circuit design tool 112 may determine respective first static probabilities at the input pins $A_{G1}$, $B_{G1}$, $A_{G2}$ and $A_{G3}$, i.e. 0.9, 0.1, 0.05 and 0.091, based on a circuit usage profile indicated by the physical design database PDB. In the present embodiment, each of the first static probabilities is SP1, which indicates a probability that a signal received at a corresponding input pin is at a logic high state.

In addition, the circuit design tool 112 may use associated logistic equations to calculate respective first static probabilities of the other input pins $B_{G2}$ and $B_{G3}$. For example, a first static probability at the input pin $B_{G2}$ is (1-0.9)×(1-0.1)=0.09, and a first static probability at the input pin $B_{G3}$ is (1-0.05)×(1-0.09)=0.8645.

At operation 416, a static probability pattern of the circuit cell is generated according to a first static probability at each input pin of the circuit cell. The static probability pattern can be implemented to include a rounding value of each first static probability of the circuit cell. For example, with reference to FIG. 1 and FIG. 7, the circuit design tool 112 may round a first static probability at an input pin to determine a corresponding second static probability, which is equal to either a first probability value or a second probability value different from the first probability value. Each second static probability of the circuit cell can serve as at least a portion of a static probability pattern of the circuit cell.

Figure 7:
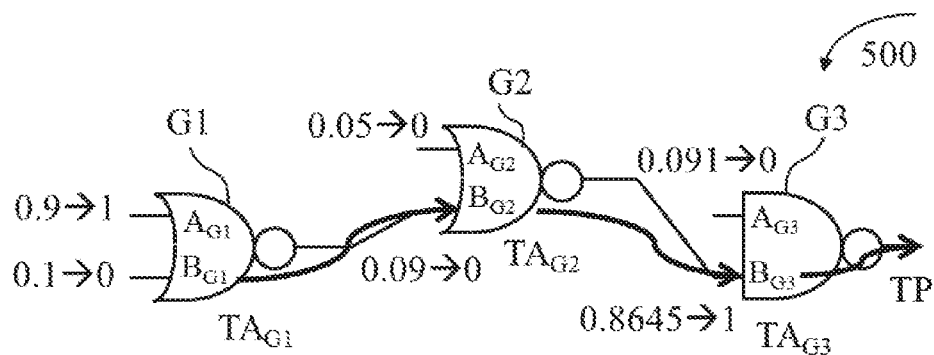
FIG. 7 illustrates an exemplary operation involved in determining timing constraints of the integrated circuit shown in FIG. 5 in accordance with some embodiments of the present disclosure.

In the embodiment shown in FIG. 7, the circuit design tool 112 may determine a second static probability by comparing a corresponding first static probability with a predetermined static probability. When the first static probability is greater than the predetermined static probability, the second static probability is set to the first probability value such as 1. When the first static probability is not greater than the predetermined static probability, the second static probability is set to the second probability value such as 0. As a result, when the predetermined static probability is set to 0.5, the first static probabilities at the input pins $A_{G1}$ and $B_{G1}$, i.e. 0.9 and 0.1, can be rounded to 1 and 0 respectively, and a static probability pattern of the NOR gate G1 can be represented as "10". Similarly, a static probability pattern of the NOR gate G2 can be represented as "00", and a static probability pattern of the NAND gate G3 can be represented as "01".

At operation 418, a pattern based timing database, also referred to as an input stress based aging timing database, is characterized. The pattern based timing database can indicate reference timing arc delays of the circuit cells, such as standard cells, under different input stress conditions. In the embodiment shown in FIG. 1, the pattern based timing database TDB can be characterized to indicate a plurality of reference delays of each timing arc of a circuit cell. The reference delays can be characterized in response to a plurality of input stress patterns applied to the circuit cell respectively. For example, referring to FIG. 2A and FIG. 2B, each of the sub-databases DB0-DB3 can be characterized by measuring respective reference delays of the timing arcs TA0-TA3 under different input stress conditions. As a result, respective reference delays of each timing arc, such as the reference delays $DL_{00}$-$DL_{30}$ of the timing arc TA0, can be characterized in response to the input stress patterns "00", "01", "10" and "11" respectively. In the present embodiment, based on the database characterization scheme described with reference to FIG. 2A and FIG. 2B, different input stress patterns can be applied to a reference circuit cell, such as a NOR gate or a NAND gate, to characterize respective reference delays of each timing arc of the NOR gate G1, the NOR gate G2 and the NAND gate G3 of the integrated circuit 400 shown in FIG. 7.

At operation 420, the pattern based timing database is derived. For example, with reference to FIG. 1, the pattern based timing database TDB is derived and stored in the storage unit 120.

At operation 422, at least one of timing delays of the circuit cells along the timing path is updated according to the static probability pattern and the pattern based timing database. For example, with reference to FIG. 1, FIG. 8A and FIG. 8B, the circuit design tool 112 may update at least one of respective timing delays of the NOR gate G1, the NOR gate G2 and the NAND gate G3 according to reference delays indicated by the pattern based timing database TDB.

Figure 8A:
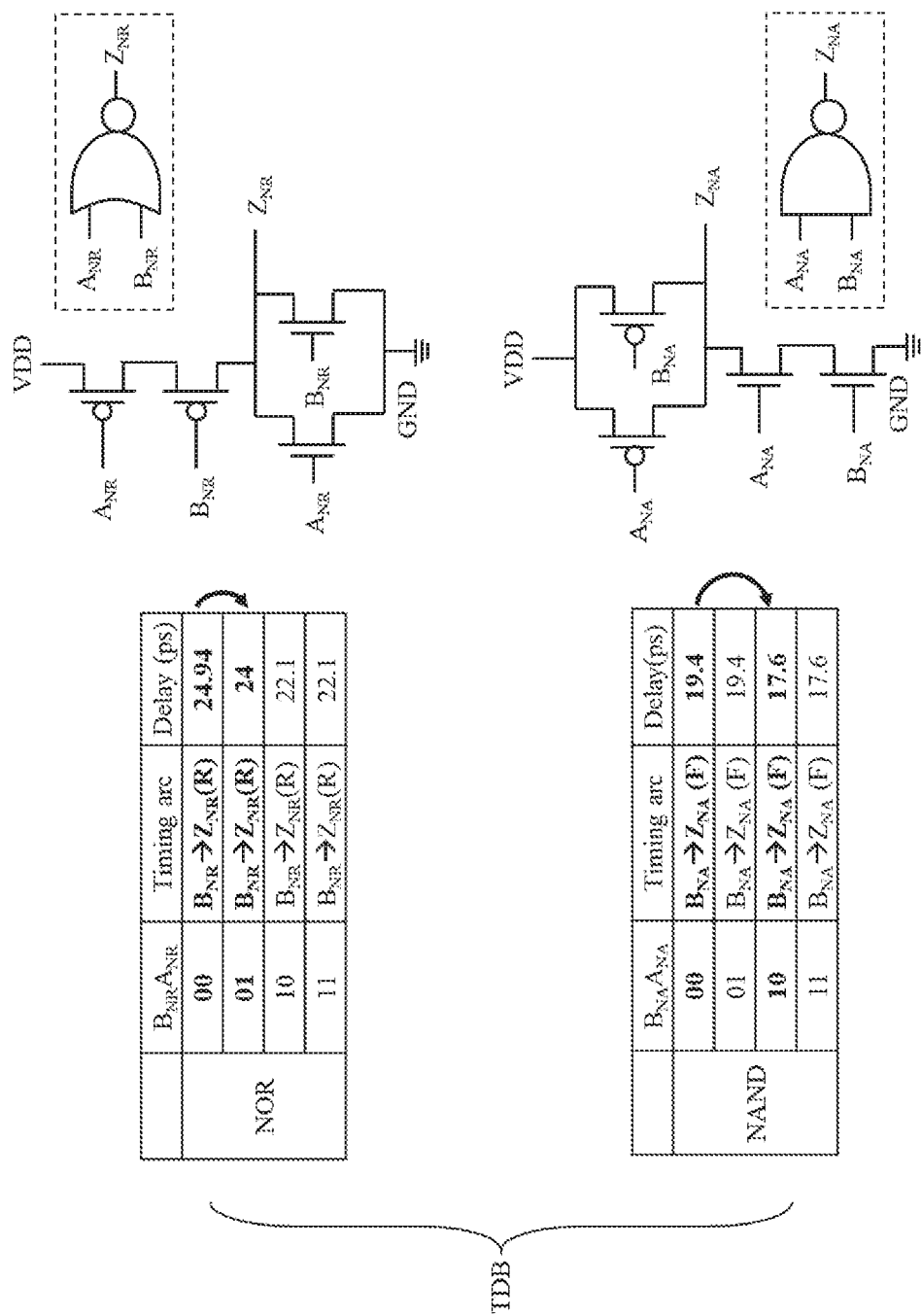

In the embodiment shown in FIG. 8A, respective reference delays of a timing arc "$B_{NR} \rightarrow Z_{NR}(R)$" of a NOR gate are characterized in response to input stress patterns "00", "01", "10" and "10" applied to input pins $B_{NR}$ and $A_{NR}$. Respective reference delays of a timing arc "$B_{NA} \rightarrow Z_{NA}(F)$" of a NAND gate are characterized in response to input stress patterns "00", "01", "10" and "10" applied to input pins $B_{NA}$ and $A_{NA}$. As the timing arc "$B_{NR} \rightarrow Z_{NR}(R)$" of the NOR gate can define a delay that a signal takes to propagate from the input pin $B_{NR}$ to an output pin $Z_{NR}$ where a low-to-high transition occurs, the reference delays of the timing arc "$BR_{NR} \rightarrow Z_{NR}(R)$" can serve as reference delays of the timing arc $TA_{G1}$ of the NOR gate G1, as well as reference delays of the timing arc $TA_{G2}$ of the NOR gate G2, shown in FIG. 8B. Similarly, respective reference delays of the timing arc "$B_{NA} \rightarrow Z_{NA}(F)$" shown in FIG. 8A can serve as reference delays of the timing arc $TA_{G3}$ of the NAND gate G3 shown in FIG. 8B.

With reference to FIG. 8A and FIG. 8B, the timing delay of the NOR gate G1 along the timing path can be updated from the predetermined delay of 24.94 ps to a reference delay of 24 ps, which is characterized in response to the input stress pattern "01" matching the static probability pattern of the NOR gate G1. For example, the circuit design tool 112 shown in FIG. 1 may select a sub-database from the pattern based timing database TDB characterized in response to the input stress pattern "01", thereby setting the timing delay of the NOR gate G1 to the reference delay of 24 ps indicated in the sub-database.

Additionally, the timing delay of the NAND gate G3 along the timing path can be updated from the predetermined delay of 19.4 ps to a reference delay of 17.6 ps, which is characterized in response to the input stress pattern "10" matching the static probability pattern of the NAND gate G3. The path delay of the timing path TP can be updated to 66.54 ps accordingly. By taking into account the real circuit usage file, the circuit design tool 112 can determine a more realistic timing margin, thus improving circuit performance of the integrated circuit 500.

At operation 424, a timing margin of the integrated circuit is optimized at least according to a circuit topology thereof. For example, with reference to FIG. 1, FIG. 9A and FIG. 9B, the circuit design tool 112 may update at least one of respective timing delays of the NOR gate G1, the NOR gate G2 and the NAND gate G3 according to pin sensitivity or pin connection information indicated by the pattern based timing database TDB.

In the embodiment shown in FIG. 9A and FIG. 9B, a highly sensitive pin can be connected to a low stress probability signal, and a less sensitive pin can be connected to a high stress probability signal to mitigate performance impact due to aging. For example, as shown in FIG. 9A, a reference delay of a timing arc "$A_{NR} \rightarrow Z_{NR}(R)$", which is characterized in response to the input stress pattern "10" complementary to the static probability pattern "01" of the NOR gate G1, is shorter than the reference delay of the timing arc "$B_{NR} \rightarrow Z_{NR}(R)$", which is characterized in response to the input stress pattern "01" matching to the static probability pattern "01" of the NOR gate G1. As shown in FIG. 9B, the input pins $A_{G1}$ and $B_{G1}$ of the NOR gate G1 can be swapped such that a timing arc $TA_{G1}'$, defining a timing relationship between the input pin $A_{G1}$ and the output pin $Z_{G1}$, is included in the timing path TP. The timing delay of the NOR gate G1 can be updated to a reference delay of 21.93 ps for timing optimization.

In some embodiments, the reference delay of the timing arc "$B_{NR} \rightarrow Z_{NR}(R)$" may be indicated in a first sub-database characterized in response to the input stress pattern "01" matching the static probability pattern, and the reference delay of the timing arc "$A_{NR} \rightarrow Z_{NR}(R)$" may be indicated in a second sub-database characterized in response to the input stress pattern "10" complementary to the static probability pattern. As a result, the circuit design tool 112 shown in FIG. 1 may select, from the pattern based timing database TDB, the first sub-database and the second sub-database to determining if a reference delay of the timing arc $TA_{G1}'$ indicated by the second sub-database is shorter than a reference delay of the timing arc $TA_{G1}$ indicated by the first sub-database.

Similarly, as shown in FIG. 9A, a reference delay of a timing arc "$A_{NA} \rightarrow Z_{NA}(F)$" of the NAND gate, characterized in response to the input stress pattern "01" complementary to the static probability pattern "10" of the NAND gate G3, is shorter than the reference delay of the timing arc "$B_{NA} \rightarrow Z_{NA}(F)$". Hence, as shown in FIG. 9B, the input pins $A_{G3}$ and $B_{G3}$ of the NNAD gate G3 can be swapped to update the timing delay of the NAND gate G3. Accordingly, the path delay of the timing path TP can be updated to 63.81 ps.

In some embodiments, the pattern based timing database TDB may indicate timing arc delay information of multiple reference circuit cells, which have a same cell type but different device parameters such as cell sizes or transistor threshold voltages. Reference delays of a timing arc of a circuit cell, having a same cell type as the reference circuit cells, can be characterized by applying different input stress patterns to the reference circuit cells. Hence, the timing margin of the integrated circuit can be further optimized according to device parameter information. By way of example but not limitation, with reference to FIG. 10A and FIG. 10B, the pattern based timing database TDB shown in FIG. 1 may indicate reference delays of two NOR gates, which are different reference circuit cells having a same cell type but different device parameters D1 and D2. Reference delays of timing arcs of the NOR gate G1/G2 can be characterized by applying the input stress patterns to these two NOR gates. As a NOR gate having a smaller size may exhibit a shorter reference delay than a NOR gate having a larger size, the NOR gate G2 can be implemented by the NOR gate exhibiting a reference delay of 23.75 ps for the timing arc "$B_{NR} \rightarrow Z_{NR}(R)$". The path delay of the timing path TP can be updated to 62.62 ps accordingly. As another example, the two NOR gates shown in FIG. 10A have different transistor threshold voltages. The NOR gate G2 can be implemented by the NOR gate having a lower transistor threshold voltage, thereby reducing the timing delay for the timing arc "$B_{NR} \rightarrow Z_{NR}(R)$".

Figures 10A, 10B:
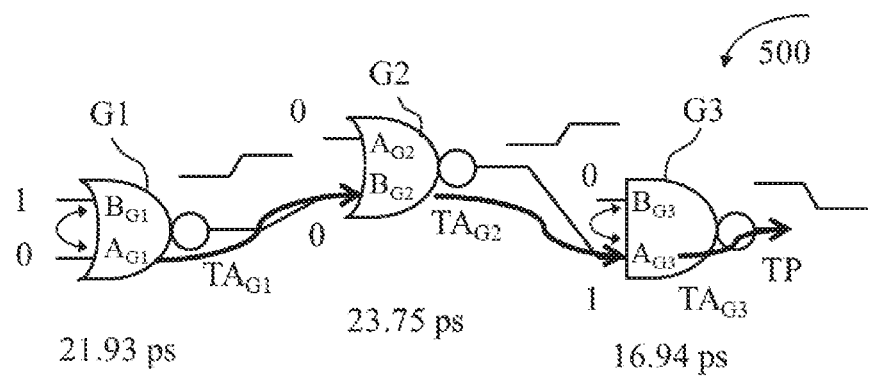
FIG. 10A and FIG. 10B illustrate an exemplary operation involved in determining timing constraints of the integrated circuit shown in FIG. 5 in accordance with some embodiments of the present disclosure.

At operation 426, a physical design database is updated. For example, as pin connection and device parameters of the circuit cells shown in FIG. 10B are different from that shown in FIG. 5, the circuit design tool 112 shown in FIG. 1 may update the physical design database PDB by rerouting and legalizing the circuit cells shown in FIG. 10B. As a result, the design information INF, provided to the circuit generation system 104 for circuit manufacturing, can indicate the updated physical design database PDB.

The above is for illustrative purposes only, and is not intended to limit the scope of the present disclosure. In some embodiments, various rounding methods can be used in operation 416 to convert first static probabilities of a circuit cell to a static probability pattern thereof. By way of example but not limitation, the predetermined static probability can be set to a probability value different from 0.5. In some embodiments, a static probability pattern of a circuit cell is not limited to be represented by a two-bit binary value. For example, a static probability pattern of a circuit cell having M input terminals can be represented as an M-bit binary value, where M is an integer. As a result, a static probability pattern of a circuit cell having three input terminals can be represented as a three-bit binary value.

Figure 11:
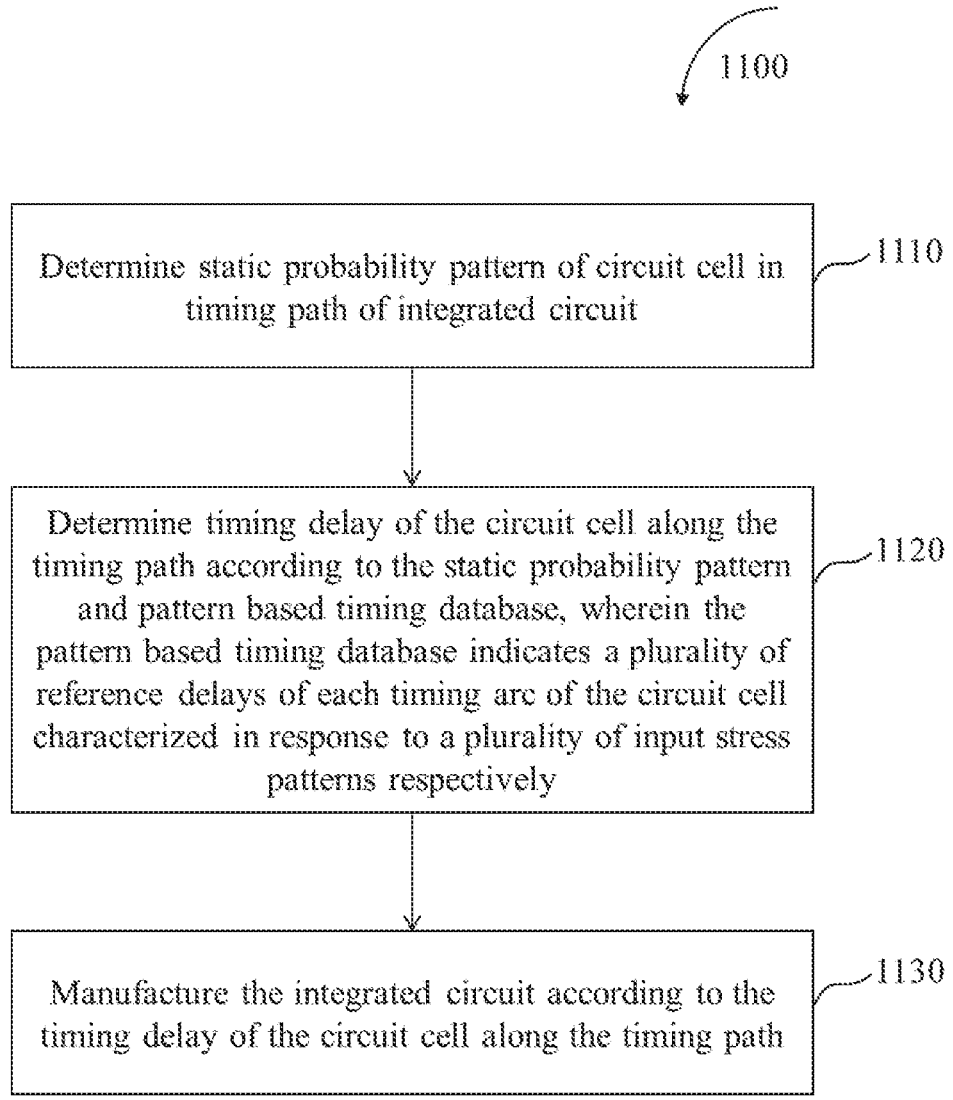
FIG. 11 is a flow chart of an exemplary method for manufacturing an integrated circuit in accordance with some embodiments of the present disclosure.

FIG. 11 is a flow chart of an exemplary method for manufacturing an integrated circuit in accordance with some embodiments of the present disclosure. The method 1100 may be employed in system 100 shown in FIG. 1, thereby mitigating performance impact on the integrated circuit due to aging. Those skilled in the art should appreciate that the method 1100 can be employed in other systems for manufacturing an integrated circuit without departing from the scope of the present disclosure. Additionally, in some embodiments, other operations in the method 1100 can be performed. In some embodiments, operations of the method 1100 can be performed in a different order and/or vary.

At operation 1110, a static probability pattern of a circuit cell in a timing path of the integrated circuit is determined. For example, in the embodiment shown in FIG. 1, the circuit design tool 112, when launched by the control circuit 110, is configured to determine a static probability pattern of each circuit cell in a timing path of an integrated circuit, such as a critical path of the integrated circuit. The static probability pattern can indicate a static probability of a signal received at each input pin of the circuit cell. As a result, the circuit design system 102 can take into account a circuit usage profile of the integrated circuit during the design process. In some embodiments, at least part of operation 1110 shown in FIG. 11 can be implemented by operations 412-416 shown in FIG. 4.

At operation 1120, a timing delay of the circuit cell along the timing path is determined according to the static probability pattern and a pattern based timing database. The pattern based timing database can indicate a plurality of reference delays of each timing arc of the circuit cell characterized in response to a plurality of input stress patterns respectively. For example, with reference to FIG. 5 to FIG. 8B, the timing delay of the NOR gate G1 along the timing path TP can be set to a reference delay of the timing arc $TA_{G1}$, i.e. 24 ps, characterized in response to an input stress pattern matching the static probability pattern "01". As another example, with reference to FIG. 4 to FIG. 9B, the input pins $A_{G1}$ and $B_{G1}$ can be swapped such that the timing arc $TA_{G1}'$ is included in the timing path TP. The timing delay of the NOR gate G1 along the timing path TP can be set to a reference delay of the timing arc $TA_{G1}'$, i.e. 21.93 ps, characterized in response to an input stress pattern complementary to the static probability pattern "01". In some embodiments, at least part of operation 1120 shown in FIG. 11 can be implemented by operations 418-424 shown in FIG. 4.

At operation 1130, the integrated circuit is manufactured according to the timing delay of the circuit cell along the timing path. For example, with reference to FIG. 1, the circuit design system 102 may generate the design information INF which indicates the determined timing delay of each circuit cell of the integrated circuit, and the circuit generation system 104 may refer to the design information INF to manufacture the integrated circuit. As the design information INF can indicate optimized or more realistic timing delays, the integrated circuit can have a more realistic timing margin and improved circuit performance.

In some embodiments, an exemplary method for manufacturing an integrated circuit may set a timing delay of each circuit cell of the integrated circuit according sub-databases included in a pattern based timing database. FIG. 12 is a flow chart of an exemplary method for manufacturing an integrated circuit in accordance with some embodiments of the present disclosure. The method 1100 may be employed in system 100 shown in FIG. 1, thereby mitigating performance impact on the integrated circuit due to aging. Those skilled in the art should appreciate that the method 1100 can be employed in other systems for manufacturing an integrated circuit without departing from the scope of the present disclosure. Additionally, in some embodiments, other operations in the method 1100 can be performed. In some embodiments, operations of the method 1100 can be performed in a different order and/or vary.

With the use of a pattern based timing database, the method for manufacturing an integrated circuit can determine timing arc delays in the integrated circuit by taking into account the real circuit usage profile and aging sensitivity difference in standard cell pins. As a result, the timing margin of the integrated circuit can be more realistic, thus improving performance of aging-critical digital designs.

Some embodiments described herein may include a method for manufacturing an integrated circuit. The method includes determining a static probability pattern of a circuit cell in a timing path of the integrated circuit; determining a timing delay of the circuit cell along the timing path according to the static probability pattern and a pattern based timing database, wherein the pattern based timing database indicates a plurality of reference delays of each timing arc of the circuit cell characterized in response to a plurality of input stress patterns respectively; and manufacturing the integrated circuit according to the timing delay of the circuit cell along the timing path.

Some embodiments described herein may include a method for manufacturing an integrated circuit. The method includes determining static probability information of a set of circuit cells in a timing path of the integrated circuit; determining a timing delay of each circuit cell in the set of circuit cells along the timing path according to the static probability information and a pattern based timing database, wherein the pattern based timing database comprises N sub-databases characterized by N input stress patterns respectively, N is a positive integer greater than one, and each of the N sub-databases indicates respective reference delays of timing arcs of the circuit cell characterized in response to a corresponding input stress pattern; and manufacturing the integrated circuit according to the timing delay of the circuit cell along the timing path.

Some embodiments described herein may include a method for manufacturing an integrated circuit. The method includes determining a static probability pattern of a circuit cell in a timing path of the integrated circuit; characterizing N reference delays of a timing arc of the circuit cell in response to N input stress patterns applied to a reference circuit cell respectively, N being an integer greater than one, the reference circuit cell having a same cell type as the circuit cell; setting a timing delay of the circuit cell along the timing path to one of the N reference delays according to the static probability pattern; and manufacturing the integrated circuit according to the timing delay of the circuit cell along the timing path.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method for manufacturing an integrated circuit, comprising:
    determining a static probability pattern of a circuit cell in a timing path of the integrated circuit; and
    determining a timing delay of the circuit cell along the timing path according to the static probability pattern and a pattern based timing database, wherein the pattern based timing database indicates N reference delays of each timing arc of the circuit cell characterized in response to N input stress patterns applied to a reference circuit cell respectively, N is a positive integer greater than one, and the reference circuit cell having a same cell type as the circuit cell; and
    manufacturing the integrated circuit according to the timing delay of the circuit cell along the timing path.

2. The method of claim 1, wherein determining the timing delay of the circuit cell along the timing path according to the static probability pattern and the pattern based timing database comprises:
    setting the timing delay to a reference delay of a timing arc of the circuit cell, the timing arc being included in the timing path, the reference delay of the timing arc being characterized in response to an input stress pattern matching the static probability pattern.

3. The method of claim 1, wherein the circuit cell comprises a first timing arc and a second timing arc, the first timing arc is included in the timing path and formed between a first input pin and an output pin of the circuit cell, and the second timing arc is formed between a second input pin and the output pin of the circuit cell; determining the timing delay of the circuit cell along the timing path according to the static probability pattern and the pattern based timing database comprises:
    determining if a reference delay of the second timing arc is shorter than a reference delay of the first timing arc of the circuit cell, the reference delay of the first timing arc being characterized in response to an input stress pattern matching the static probability pattern, the reference delay of the second timing arc being characterized in response to an input stress pattern complementary to the static probability pattern;
    when it is determined that the reference delay of the second timing arc is shorter than the reference delay of the first timing arc, swapping the first input pin and the second input pin such that the second timing arc is included in the timing path; and
    setting the timing delay to the reference delay of the second timing arc of the circuit cell.

4. The method of claim 1, wherein determining the static probability pattern of the circuit cell in the timing path of the integrated circuit comprises:
    determining a first static probability at each input pin of the circuit cell, the first static probability at the input pin indicating a probability that a signal received at the input pin is at a predetermined logic state; and
    generating the static probability pattern of the circuit cell according to the first static probability at the input pin.

5. The method of claim 4, wherein the predetermined logic state is a logic high state.

6. The method of claim 4, wherein determining the first static probability at the input pin of the circuit cell comprises:
    performing static probability propagation along the timing path to determine the first static probability.

7. The method of claim 4, wherein generating the static probability pattern of the circuit cell according to the first static probability at the input pin comprises:
    determining a second static probability at the input pin by rounding the first static probability, wherein the second static probability is equal to one of a first probability value and a second probability value different from the first probability values, and serves as at least a portion of the static probability pattern.

8. The method of claim 7, wherein determining the second static probability at the input pin by rounding the first static probability comprises:
    comparing the first static probability with a predetermined static probability;
    when the first static probability is greater than the predetermined static probability, setting the second static probability to the first probability value; and
    when the first static probability is not greater than the predetermined static probability, setting the second static probability to the second probability value.

9. The method of claim 1, wherein the reference delays of the timing arc of the circuit cell indicated by the pattern based timing database are characterized by applying the input stress patterns to a plurality of reference circuit cells having a same cell type as the circuit cell, and the reference circuit cells have different cell sizes.

10. The method of claim 1, wherein the reference delays of the timing arc of the circuit cell indicated by the pattern based timing database are characterized by applying the input stress patterns to a plurality of reference circuit cells having a same cell type as the circuit cell, and the reference circuit cells have different transistor threshold voltages.

11. The method of claim 1, further comprising:
determining a critical path of the integrated circuit, the critical path serving as the timing path.

12. A method for manufacturing an integrated circuit, comprising:
determining static probability information of a set of circuit cells in a timing path of the integrated circuit;
determining a timing delay of each circuit cell in the set of circuit cells along the timing path according to the static probability information and a pattern based timing database, wherein the pattern based timing database comprises N sub-databases characterized by N input stress patterns applied to a reference circuit cell respectively, N is a positive integer greater than one, the reference circuit cell having a same cell type as the circuit cell, and each of the N sub-databases indicates respective reference delays of timing arcs of the circuit cell characterized in response to a corresponding input stress pattern; and
manufacturing the integrated circuit according to the timing delay of the circuit cell along the timing path.

13. The method of claim 12, wherein the static probability information indicates a static probability pattern of the circuit cell; determining the timing delay of the circuit cell along the timing path according to the static probability information and the pattern based timing database comprises:
selecting, from the N sub-databases, a sub-database characterized by an input stress pattern matching the static probability pattern; and
setting the timing delay to a reference delay of a timing arc of the circuit cell indicated by the sub-database, the timing arc being included in the timing path.

14. The method of claim 12, wherein the static probability information indicates a static probability pattern of the circuit cell; a first timing arc of the circuit cell is included in the timing path and formed between a first input pin and an output pin of the circuit cell; a second timing arc is formed between a second input pin and the output pin of the circuit cell; determining the timing delay of the circuit cell along the timing path according to the static probability information and the pattern based timing database comprises:
selecting, from the N sub-databases, a first sub-database characterized by an input stress pattern matching the static probability pattern;
selecting, from the N sub-databases, a second sub-database characterized by an input stress pattern complementary to the static probability pattern;
determining if a reference delay of the second timing arc indicated by the second sub-database is shorter than a reference delay of the first timing arc indicated by the first sub-database;
when it is determined that the reference delay of the second timing arc is shorter than the reference delay of the first timing arc, swapping the first input pin and the second input pin such that the second timing arc is included in the timing path; and
setting the timing delay to the reference delay of the second timing arc of the circuit cell.

15. The method of claim 12, wherein determining the static probability information of the set of circuit cells in the timing path of the integrated circuit comprises:
determining a first static probability at each input pin of the circuit cell, the first static probability at the input pin indicating a probability that a signal received at the input pin is at a predetermined logic state; and
generating a static probability pattern of the circuit cell according to the first static probability at the input pin, the static probability pattern serving as at least part of the static probability information.

16. The method of claim 15, wherein the predetermined logic state is a logic high state.

17. The method of claim 15, wherein generating the static probability pattern of the circuit cell according to the first static probability at the input pin comprises:
determining a second static probability at the input pin by rounding the first static probability, wherein the second static probability is equal to one of a first probability value and a second probability value different from the first probability values, and serves as at least a portion of the static probability pattern.

18. A method for manufacturing an integrated circuit, comprising:
determining a static probability pattern of a circuit cell in a timing path of the integrated circuit;
characterizing N reference delays of a timing arc of the circuit cell in response to N input stress patterns applied to a reference circuit cell respectively, N being an integer greater than one, the reference circuit cell having a same cell type as the circuit cell;
setting a timing delay of the circuit cell along the timing path to one of the N reference delays according to the static probability pattern; and
manufacturing the integrated circuit according to the timing delay of the circuit cell along the timing path.

19. The method of claim 18, wherein the N reference delays are represented by derating factors respectively; the timing delay is equal to a corresponding derating factor multiplied by a base delay of the timing arc; and the base delay is characterized without applying the N input stress patterns to the circuit cell.

20. The method of claim 18, wherein determining the static probability pattern of the circuit cell in the timing path of the integrated circuit comprises:
determining a first static probability at each input pin of the circuit cell, the first static probability at the input pin indicating a probability that a signal received at the input pin is at a predetermined logic state; and
rounding the first static probability to generate a second static probability serving as at least a portion of the static probability pattern, the second static probability being equal to one of a first probability value and a second probability value different from the first probability value.

* * * * *